US012749168B2

(12) United States Patent
Lerner

(10) Patent No.: US 12,749,168 B2
(45) Date of Patent: Sep. 29, 2026

(54) METHODS FOR EXAMINING A CONDITION OF A SENSOR

(71) Applicant: Toyota Jidosha Kabushiki Kaisha, Toyota (JP)

(72) Inventor: Emily Lerner, Ypsilanti, MI (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 282 days.

(21) Appl. No.: 18/432,651

(22) Filed: Feb. 5, 2024

(65) Prior Publication Data

US 2025/0252544 A1 Aug. 7, 2025

(51) Int. Cl.
*B60W 50/02* (2012.01)
*G06T 7/00* (2017.01)

(52) U.S. Cl.
CPC .................................. *G06T 7/0002* (2013.01)

(58) Field of Classification Search
None
See application file for complete search history.

(56) References Cited

U.S. PATENT DOCUMENTS 10,204,461 B2 2/2019 Chen et al.
11,145,146 B2 10/2021 Mercep et al.
2011/0249371 A1* 10/2011 Jin ........................... H02H 5/04 361/103
2014/0306799 A1 10/2014 Ricci
2015/0145995 A1* 5/2015 Shahraray ............... H04W 4/70 348/148
2016/0295750 A1* 10/2016 Zhang ...................... F24F 11/38
2020/0263996 A1* 8/2020 Gokhale ................. G01S 17/89
2020/0375426 A1* 12/2020 Wang ........................ A47L 9/30
2021/0065473 A1 3/2021 Diehl et al.
2023/0083888 A1* 3/2023 Zavesky ................. H04L 67/12 700/110
2023/0177704 A1* 6/2023 Sakamoto .......... G01C 21/1656 340/457
2024/0219537 A1* 7/2024 Charles ................. G01S 17/931

FOREIGN PATENT DOCUMENTS

CN 103345593 * 10/2013 ............. G06F 19/00
CN 112289279 * 1/2021 ............... G09G 5/10
CN 114620056 A 6/2022
CN 115375770 * 11/2022 ............... G06N 3/04

* cited by examiner

*Primary Examiner* — Beniyam Menberu
(74) *Attorney, Agent, or Firm* — DINSMORE & SHOHL LLP

(57) ABSTRACT

A method for examining a condition of a vehicle sensor may include collecting a first data point from a first sensor at a first data collection point, wherein the first sensor is configured on a vehicle, determining a location of the first data collection point, comparing the first data point to a previously collected data point from the first sensor from a second data collection point, wherein the first data collection point and the second data collection point are within a predetermined distance of one another, and determining a condition of the first sensor.

16 Claims, 8 Drawing Sheets

METHODS FOR EXAMINING A CONDITION OF A SENSOR

FIELD

The present disclosure relates to methods for examining a condition of a sensor.

TECHNICAL BACKGROUND

Various types of sensors may be used by vehicles to capture data on the operation of the car, the conditions surrounding the vehicle, the status of the operator or passengers, and/or various other types of data. To determine if a sensor is faulty, the sensor may need to be removed from the vehicle and tested, such as on a standalone test bench.

SUMMARY

Sensors, such as those used on vehicles, may deteriorate, become damaged, or otherwise not function properly over time. A poorly functioning sensor may provide incorrect or missing data to a vehicle, which may negatively affect the performance and operation of the vehicle. Oftentimes, sensors must be removed from the vehicle and tested on a separate test bench or similar setup in order to verify they are in proper working condition. This may increase the complexity of evaluating a condition of a sensor and reduce the practicality of frequent sensor condition examinations. Therefore, there exists a need for a method for evaluating a condition of a sensor which may be able to be performed quickly, in real time, and/or while the sensor is still mounted on the vehicle.

The present methods can evaluate the condition of a sensor without the need to remove the sensor from the vehicle by comparing the data collected from the sensor to data collected from other data sources and/or data collected by the same sensor at or near the same location at a previous point in time.

The system may generally include a vehicle having one or more sensors, a memory unit, a processor, an alert display, a location device, and a communication device. The one or more sensors may collect data about various aspects of the operation of the vehicle, the surroundings of the vehicle, the operator or passengers of the vehicle, and/or other possible data sources. The data may be stored in the memory unit. The location of the collection point of the data may also be stored in the memory unit. The data may be communicated to various other entities through the communication device.

According to one embodiment, a method for examining a condition of a vehicle sensor may include collecting a first data point from a first sensor at a first data collection point, wherein the first sensor is configured on a vehicle, determining a location of the first data collection point, comparing the first data point to a previously collected data point from the first sensor from a second data collection point, wherein the first data collection point and the second data collection point are within a predetermined distance of one another, and determining a condition of the first sensor.

According to another embodiment, a method for examining a condition of a vehicle sensor may include the steps of collecting a plurality of data points from a predetermined location by a first sensor configured on a vehicle, determining a statistical confidence interval of the plurality of data points, collecting a current data point from a first sensor at the predetermined location, comparing the current data point to the statistical confidence interval of the plurality of data points, and determining a condition of the first sensor.

According to a further embodiment, a method for examining a condition of a vehicle sensor may include the steps of collecting a first data point from a first sensor at a first data collection point, wherein the first sensor is configured on a vehicle, determining a location of the first data collection point, collecting a secondary data point from a secondary sensor at a secondary data collection point, wherein the secondary sensor is configured on a secondary vehicle, determining a location of the secondary data collection point, communicating the secondary data point to the first vehicle, comparing the first data point to the secondary data point, wherein the first data collection point and the secondary data collection point are within a predetermined distance of one another, and determining a condition of the first sensor.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of the present disclosure may be better understood when read in conjunction with the following drawings in which.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

Embodiments of the present disclosure are directed to methods for determining a condition of a sensor. The methods may include steps to verify the condition of the sensor while the sensor remains mounted to a vehicle. The data collected by the sensor may be compared to a data point previously collected by the sensor to determine if the sensor is in an acceptable operating condition. Acceptable operating condition means the sensor is functioning as intended and the data can be relied upon. In other embodiments, the data collected by the sensor may also be compared to a statistical confidence interval of previously collected data points to determine if the sensor is in an acceptable operating condition. In other embodiments, the data collected by the sensor may also be compared to data collected from a sensor configured on a second vehicle, where the data collected from the sensor configured on the second vehicle is communicated to the first vehicle.

Conventional sensor condition verification methods may require the sensor to be removed from the vehicle and tested on an external test bench. Embodiments can evaluate the condition of the sensor through various methods while the sensor is still mounted on the vehicle using data already generated by the vehicle and/or other vehicles.

Figure 1:
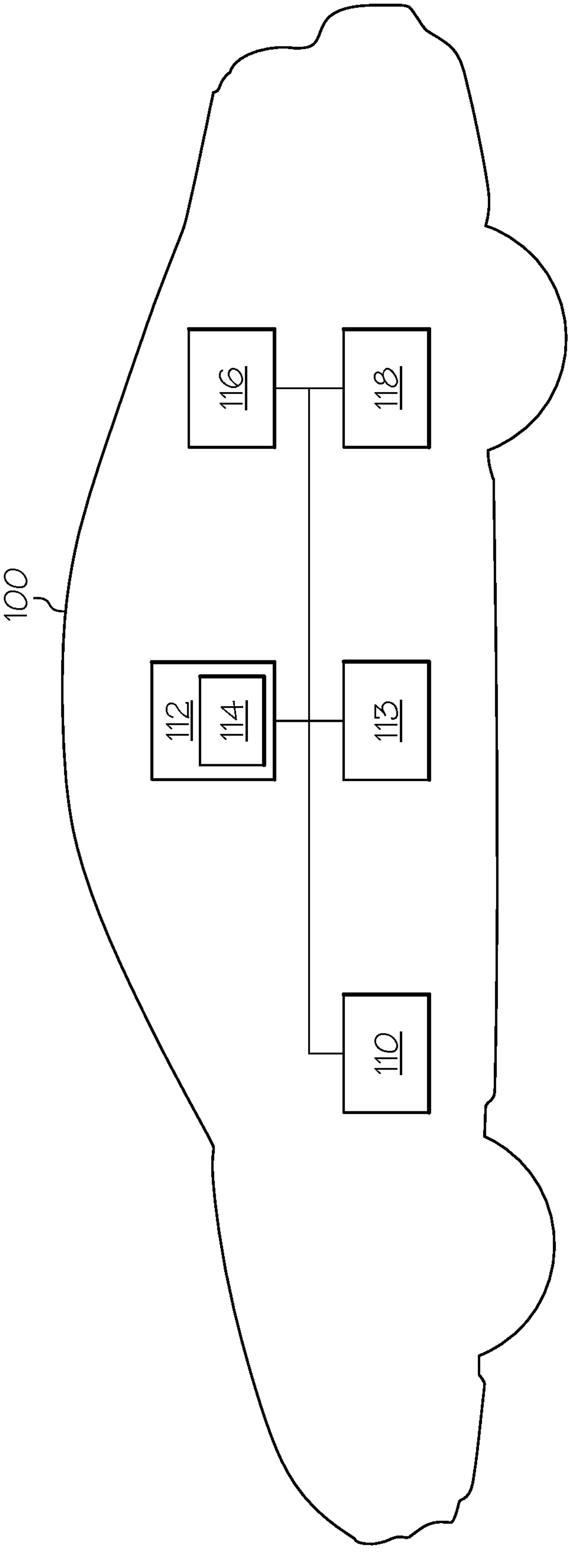
FIG. 1 schematically depicts a view of a vehicle including one or more sensors according to one or more embodiments shown and described herein.

Referring now to FIG. 1, a view of a vehicle 100 is shown. The vehicle 100 may be any suitable type of vehicle, including but not limited to a motor vehicle, an electric vehicle, an autonomous vehicle, a bus, a motorcycle, an aircraft, or any other suitable type of vehicle.

The vehicle 100 may include one or more sensors 110. The one or more sensors 110 may be configured to capture data of the operation of the vehicle 100, such as a speed of the vehicle 100, an acceleration of the vehicle 100, system performance such as a temperature of an engine of the vehicle 100, or various other operations of the vehicle. In further embodiments, the one or more sensors 110 may be configured to capture data of the surroundings of the vehicle, such as exterior temperature, camera data of a roadway the vehicle 100 is traveling upon, LIDAR data of objects surrounding the vehicle 100, or data of various other surroundings of the vehicle 100. In yet further embodiments, the one or more sensors 110 may be configured to capture data of an operator of the vehicle 100, such as an alertness level of an operator or other suitable data of the operator of the vehicle 100.

The one or more sensors 110 may be any suitable type of sensor, including but not limited to a camera sensor, a LIDAR sensor, a radar sensor, a temperature sensor, a pressure sensor, or any other suitable type of sensor 110.

The vehicle 100 may include a processor 112. The processor 112 may include a non-transitory, processor-readable storage medium 114 (referred to as memory unit 114 for brevity) for storing program modules that, when executed by the processor 112, perform one or more processes described herein. Memory unit 114 may store data from other devices, such as the one or more sensors 110, or other devices described in more detail herein. Memory unit 114 may be one or more memory devices that store data as well as software and may also comprise, for example, one or more of RAM, ROM, magnetic storage, or optical storage. Since disclosed embodiments may be implemented using an HTTPS (hypertext transfer protocol secure) environment, data transfer over a network, such as the Internet, may be done in a secure fashion.

The vehicle 100 may include an alert display 113. The alert display 113 may be any suitable device for delivering an alert to an operator of the vehicle 100. As a non-limiting example, the alert display 113 may be a graphical display, a speaker, an LED warning light, or any other suitable device, including a combination of the embodiments described above.

The vehicle 100 may include a location device 116. The location device 116 may be communicatively coupled to the processor 112. The location device 116 may determine the location of the vehicle 100 where a data point is captured by one of the one or more sensors 110. The location of the vehicle 100 where the data point is captured by one of the one or more sensors 110 may be stored in the memory unit 114. The location device 116 may be, as a non-limiting example, a global positioning system (GPS) device.

The vehicle 100 may include a communication device 118. The communication device 118 may be configured to communicate with various other systems and entities, as will be described in more detail herein.

Figure 2:
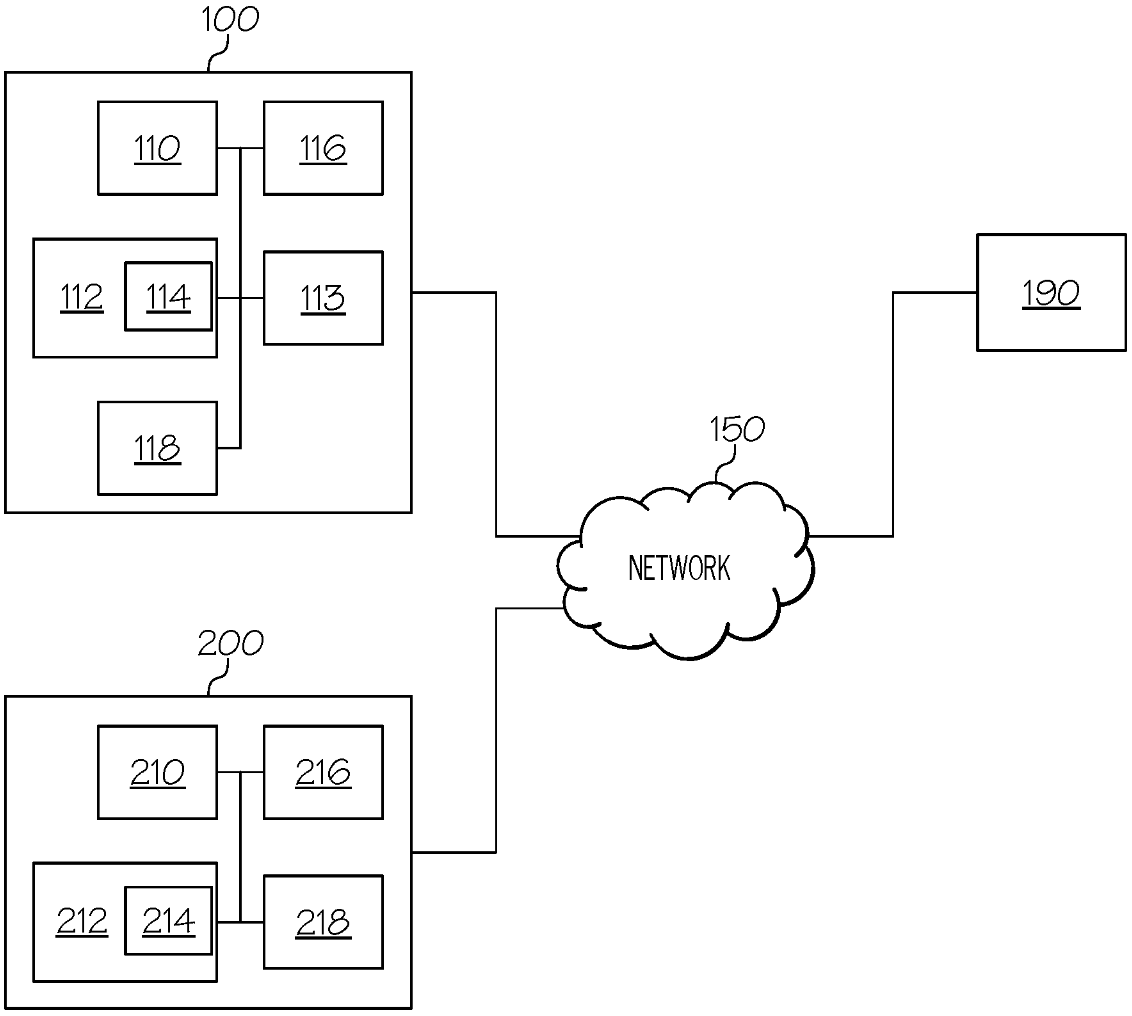
FIG. 2 schematically depicts a view of a network of entities used for examining a condition of a vehicle sensor according to one or more embodiments shown and described herein.

Referring now to FIG. 2, a group of entities connected by a network 150 is shown. The vehicle 100, a second vehicle 200, and a central data server 190 may be communicatively coupled by the network 150. The network 150 may be a shared, public, or private network, may encompass a wide area or local area, and may be implemented through any suitable combination of wired and/or wireless communication networks. Furthermore, network 150 may include a local area network (LAN), a wide area network (WAN), an intranet, Bluetooth, or the Internet. The network 150 may allow for near-real time communication between devices connected over the network. In some embodiments, the network 150 may be a vehicle to vehicle (V2V) or vehicle to everything (V2X) network.

The second vehicle 200 may include one or more sensors 210, a processor 212, a memory unit 214, a location device 216, and a communication device 218. The one or more sensors 210, the processor 212, the memory unit 214, the location device 216, and the communication device 218 may be configured in a similar fashion to that described in regard to the vehicle 100. While a single second vehicle 200 is illustrated, any number of second vehicles 200 may be connected via the network 150, such as two second vehicles 200, five second vehicles 200, or any other suitable number of second vehicles 200.

The central data server 190 may be a central system which compiles data from various data sources. As a non-limiting example, weather data such as exterior temperature may be compiled when the central data server 190 is a weather server, or camera data of the surroundings of a vehicle may be compiled when the central data server 190 is a CCTV server. While one central data server 190 is illustrated, any number of central data servers 190 may be connected via the network 150, such as two central data servers 190, five central data servers 190, or any other suitable number of central data servers 190.

Figure 3:
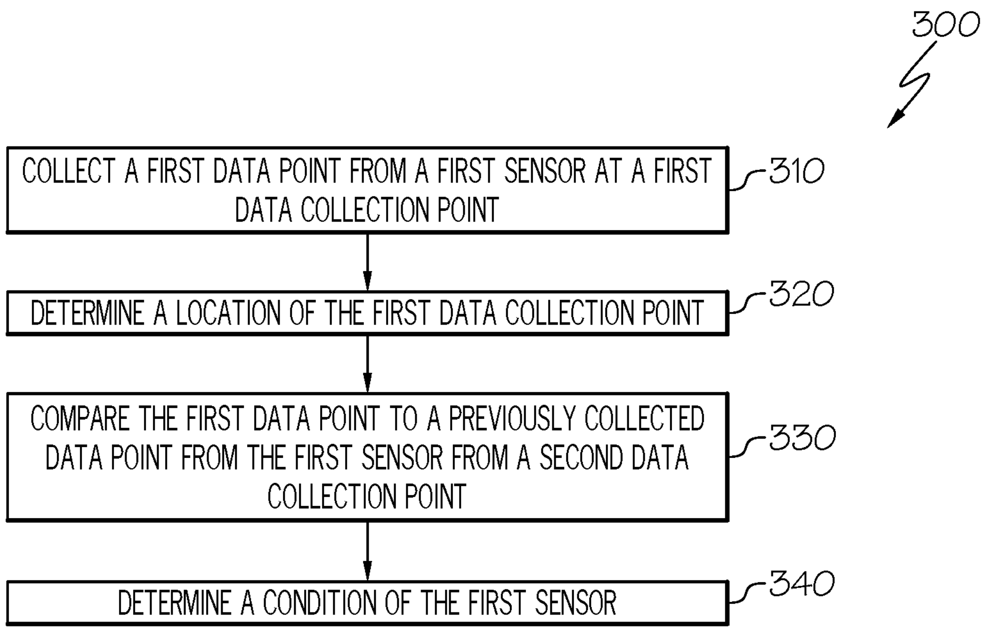
FIG. 3 schematically depicts a flowchart of a method for examining a condition of a vehicle sensor according to one or more embodiments shown and described herein.

Referring now to FIG. 3, an illustration of a method 300 is illustrated with reference to FIGS. 1-2 consistent with a disclosed embodiment. The method 300 is directed at determining a condition of a sensor. At step 310, the method 300 includes collecting a first data point from a first sensor at a first data collection point. That is, one of the one or more sensors 110 may collect the first data point at a specific location, such as a location on a roadway upon which the vehicle 100 is travelling. The first data point may be stored by the memory unit 114.

At step 320, the method 300 includes determining a location of the first data collection point. That is, the location device 116 may determine the location where the first data point is located. The location may be a GPS location, a latitude and longitude location, or any other suitable type of location. The location of the first data collection point may be tied to the first data point and stored by the memory unit 114.

At step 330, the method 300 includes comparing the first data point to a previously collected data point from the first sensor from a second data collection point. The first data collection point and the second data collection point may be within a predetermined distance of each other. As a non-limiting example, the first data collection point and the second data collection point may be within one foot of one another, within ten feet of one another, within one hundred feet of one another, within one thousand feet of one another, or any other suitable distance. By determining if the first data collection point and the second data collection point are within a predetermined distance of one another, differences between the first data point and the second data point may be assignable to the performance of the sensor and not due to differences in the location of the where the data was captured. The first data point and the second data point may be compared by the processor 112.

At step 340, the method 300 includes determining a condition of the first sensor. That is, if there is a sufficient difference between the first data point and the second data point, the processor 112 may determine the first sensor is not in suitable operating condition. In embodiments, the processor 112 may determine the first sensor is not in suitable operating condition if the first data point and the second data point are not within at least one-percent of each other, not within at least five-percent of each other, not within at least ten-percent of each other, or any other suitable difference. In further embodiments, such as when the data is non-quantifiable data such as camera data, image recognition, pixel to pixel comparison, or any other suitable comparison tool may be used to compare the first data point to the second data point.

Figure 4:
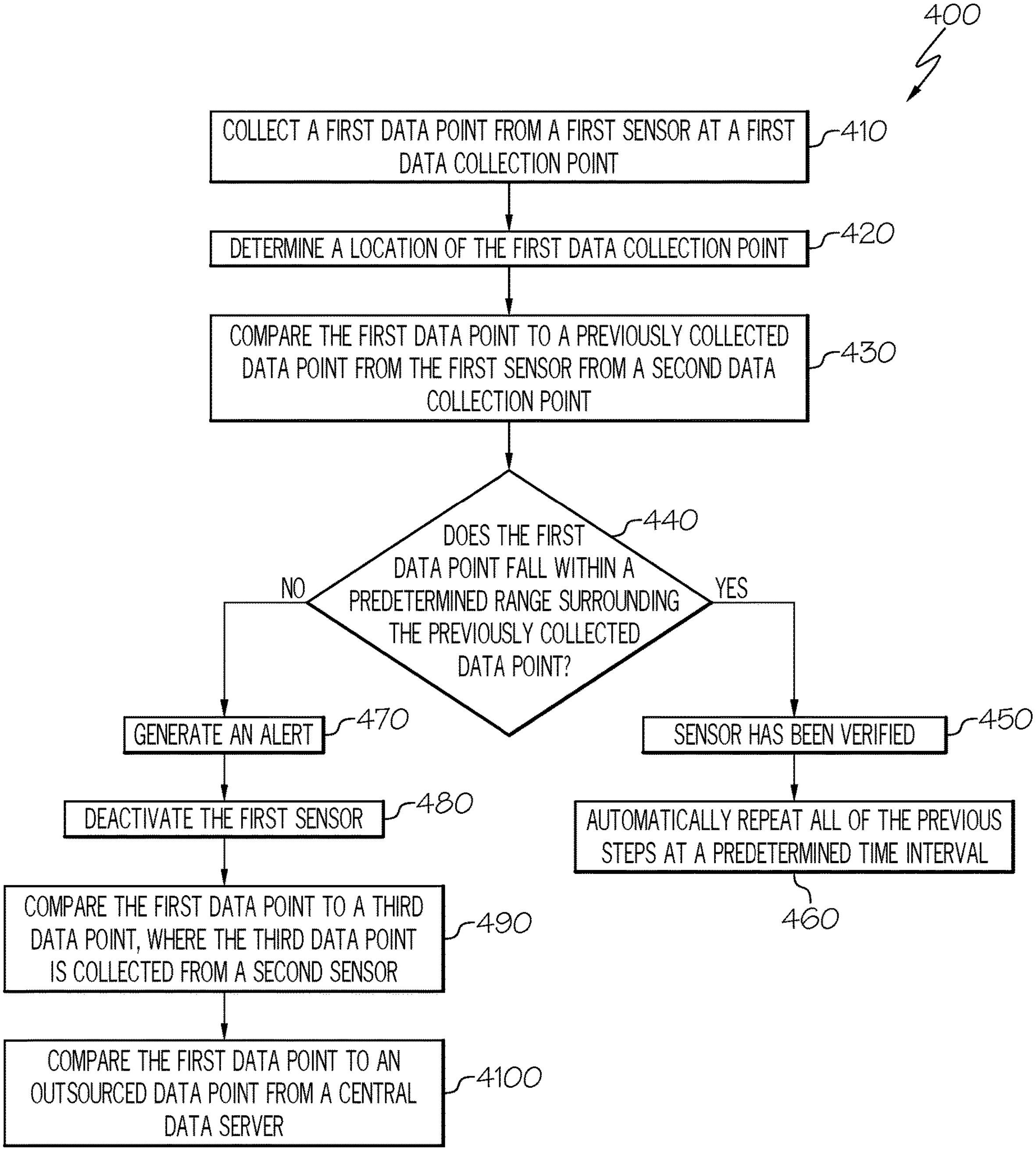
FIG. 4 schematically depicts a flowchart of a method for examining a condition of a vehicle sensor according to one or more embodiments shown and described herein.

Referring now to FIG. 4, an illustration of a method 400 is illustrated with reference to FIGS. 1-2 consistent with a disclosed embodiment. The method 400 is directed at determining a condition of a sensor. At step 410, the method 400 includes collecting a first data point from a first sensor at a first data collection point. That is, one of the one or more sensors 110 may collect the first data point at a specific location, such as a location on a roadway upon which the vehicle 100 is travelling. The first data point may be stored by the memory unit 114.

At step 420, the method 400 includes determining a location of the first data collection point. That is, the location device 116 may determine the location where the first data point is located. The location may be a GPS location, a latitude and longitude location, or any other suitable type of location. The location of the first data collection point may be tied to the first data point and stored by the memory unit 114.

At step 430, the method 400 includes comparing the first data point to a previously collected data point from the first sensor from a second data collection point. The first data collection point and the second data collection point may be within a predetermined distance of each other. As a non-limiting example, the first data collection point and the second data collection point may be within one foot of one another, within ten feet of one another, within one hundred feet of one another, within one thousand feet of one another, or any other suitable distance. By determining if the first data collection point and the second data collection point are within a predetermined distance of one another, any differences between the first data point and the second data point may be assignable to the performance of the sensor and not due to differences in the location of the where the data was captured. The first data point and the second data point may be compared by the processor 112.

At step 440, the method 400 includes determining if the first data point falls within a predetermined range surrounding the previously collected data point. That is, a predetermined range may be applied around the previously collected data point and the processor 112 may determine if the first data point falls within the predetermined range. The predetermined range may be, as a non-limiting example, plus or minus one percent, plus or minus five percent, plus or minus ten percent, or any other suitable range. In some embodiments, the predetermined range may be one sided (i.e. within one percent above only). In further embodiments, the range may be limited to the exact value of the previously collected data point. In further embodiments, such as when the data is non-quantifiable data such as camera data, image recognition, pixel to pixel comparison, or any other suitable comparison tool may be used to determine if the first data point falls within the predetermined range surrounding the previously collected data point.

If step 440 equals YES, the method 400 proceeds to step 450. If step 440 equals NO, the method 400 proceeds to step 470.

At step 450, the method 400 includes determining that the first sensor has been verified. That is, the first data point falls within a predetermined range of the previously collected data point, the processor 112 may determine that the first sensor is operating in an acceptable condition by comparing two different data points generated by the same sensor at or near the same location captured at different points in time.

At step 460, the method 400 includes automatically repeating all of the previous steps of method 400 at a predetermined time interval. That is, the steps of method 400 may be automatically repeated every second, every 30 seconds, every minute, every hour, or at any other predetermined time interval.

At step 470, the method 400 includes generating an alert. That is, if the processor 112 determines that the first data point does not fall within a predetermined range surrounding the previously collected data point, the processor 112 may generate an alert to be displayed by the alert display 113. The alert may be, as a non-limiting example, a text message indicating the first sensor is not operating properly, an illuminated warning light, an audio message indicating the first sensor is not operating properly, or any other suitable alert. The alert may indicate to the operator to inspect the sensor, de-activate the sensor, replace the sensor, or other suitable remedial techniques.

At step 480, the method 400 includes de-activating the first sensor. That is, the processor 112 may de-activate the first sensor so that the vehicle 100 does not rely on data generated by the first sensor.

At step 490, the method 400 includes comparing the first data point to a third data point, where the third data point is collected from a second sensor different from the first sensor. As a non-limiting example, if the first sensor is a temperature sensor, the processor 112 may compare the temperature recorded by the second sensor to the first sensor. This step may function as a double-check of the comparison performed at steps 430 and 440.

At step 4100, the method 400 includes comparing the first data point to an outsourced data point from a central data server. That is, the processor 112 may compare the first data point to an outsourced data point from the central data server 190. As a non-limiting example, if the first sensor is an exterior temperature sensor and the central data server 190 is a weather central data server, the processor 112 may compare the temperature collected by the first sensor to a temperature collected by the central data server 190. This step may function as a double-check of the comparison performed at steps 430 and 440.

Figure 5:
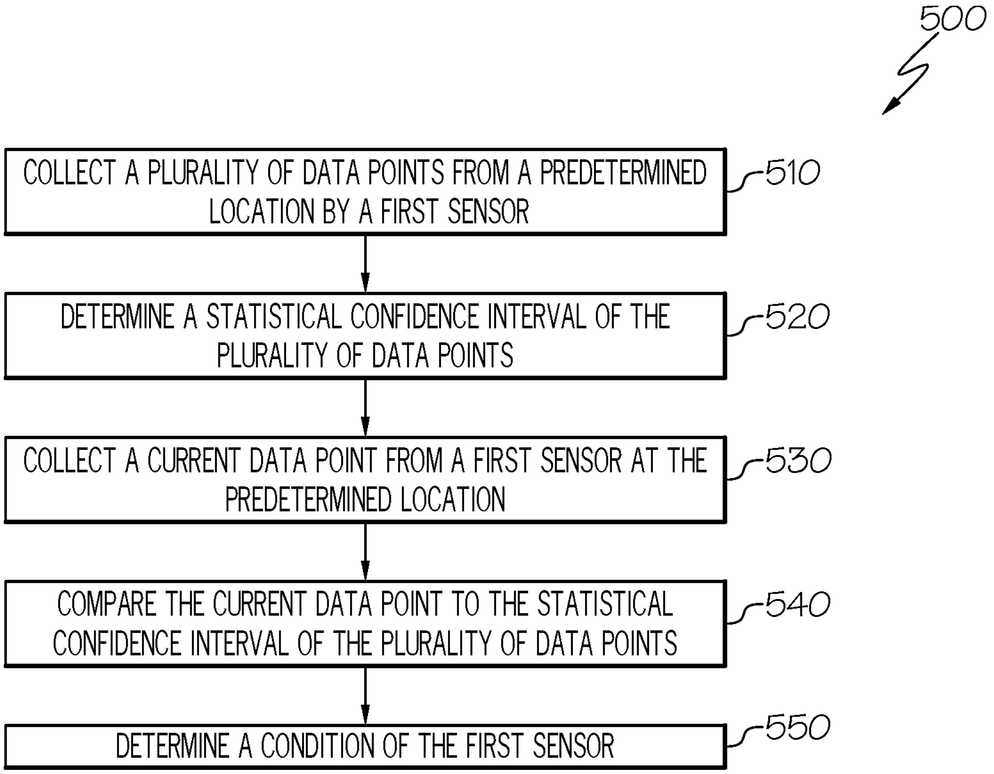
FIG. 5 schematically depicts a flowchart of a method for examining a condition of a vehicle sensor according to one or more embodiments shown and described herein.

Referring now to FIG. 5, an illustration of a method 500 is illustrated with reference to FIGS. 1-2 consistent with a disclosed embodiment. The method 500 is directed at determining a condition of a sensor. At step 510, the method 500 includes collecting a plurality of data points from a predetermined location by a first sensor. That is, the processor 112 captures data from the first sensor at a predetermined location (as determined by the location device 116) and stores the data on the memory unit 114. The processor 112 may collect any suitable number of data points, including but not limited to two data points, twenty data points, fifty data points, 100 data points, 1000 data points, or any other suitable number of data points.

At step 520, the method 500 includes determining a statistical confidence interval of the plurality of data points. That is, the processor 112 may automatically calculate a statistical confidence interval of the plurality of data points. The statistical confidence interval may be any suitable type of confidence interval, including but not limited to a 90-percent confidence interval, a 95-percent confidence interval, a 99-percent confidence interval, or any other suitable type of confidence interval.

At step 530, the method 500 includes collecting a current data point from a first sensor at the predetermined location. That is, one of the one or more sensors 110 may collect the first data point at the predetermined location. The first data point may be stored by the memory unit 114.

At step 540, the method 500 includes comparing the current data point to the statistical confidence interval of the plurality of data points. That is, the processor 112 may compare the current data point to the statistical confidence interval to determine if the current data point falls within the statistical confidence interval.

At step 550, the method 500 includes determining a condition of the first sensor. That is, if the current data point falls within the statistical confidence interval, the processor 112 may determine that the first sensor is in suitable operating condition. If the current data point does not fall within the statistical confidence interval, the processor 112 may determine that the first sensor is not in suitable operating condition.

Figure 6:
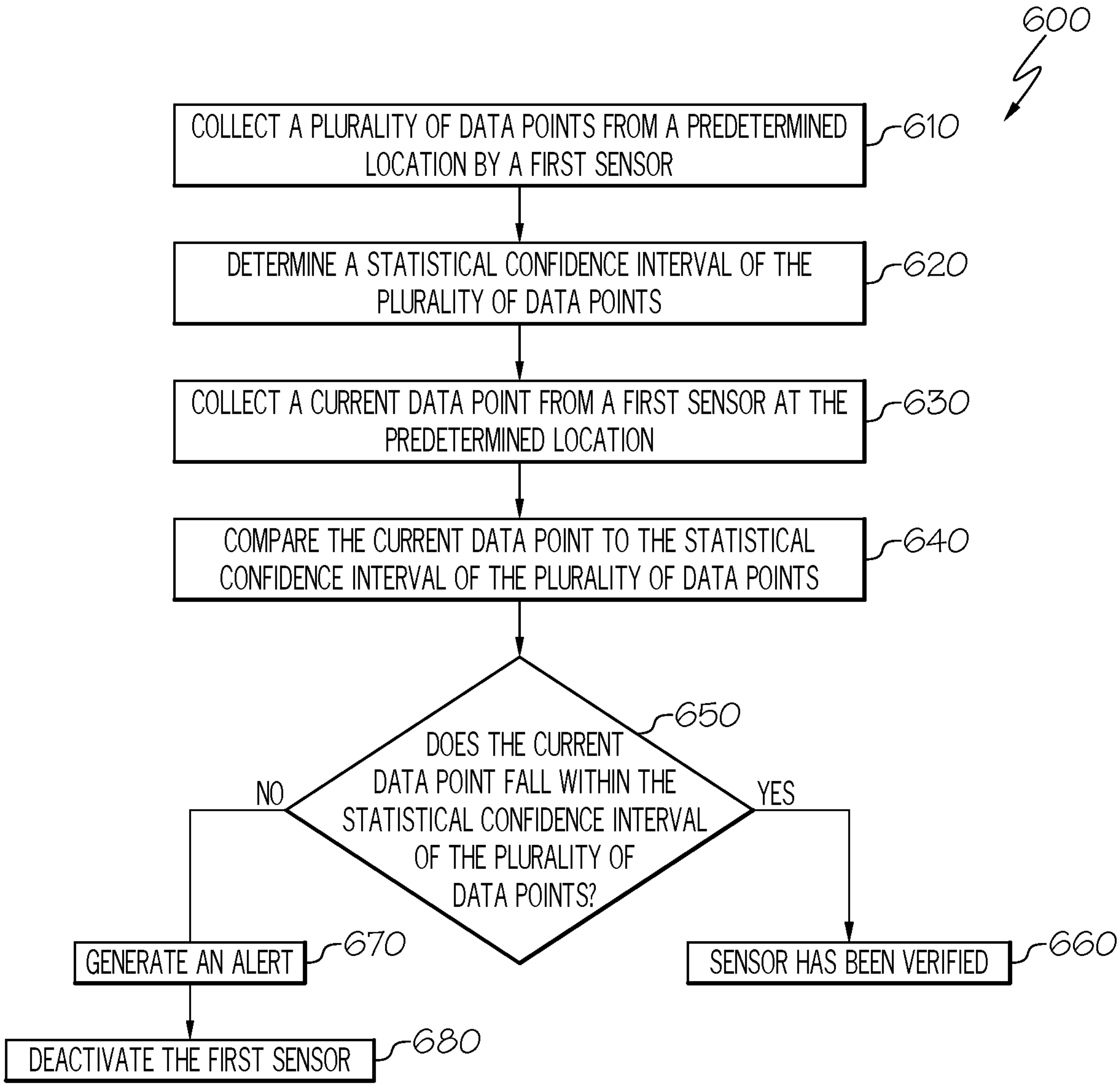
FIG. 6 schematically depicts a flowchart of a method for examining a condition of a vehicle sensor according to one or more embodiments shown and described herein.

Referring now to FIG. 6, an illustration of a method 600 is illustrated with reference to FIGS. 1-2 consistent with a disclosed embodiment. The method 600 is directed at determining a condition of a sensor. At step 610, the method 600 includes collecting a plurality of data points from a predetermined location by a first sensor. That is, the processor 112 captures data from the first sensor at a predetermined location (as determined by the location device 116) and stores the data on the memory unit 114. The processor 112 may collect any suitable number of data points, including but not limited to two data points, twenty data points, fifty data points, 100 data points, 1000 data points, or any other suitable number of data points.

At step 620, the method 600 includes determining a statistical confidence interval of the plurality of data points. That is, the processor 112 may automatically calculate a statistical confidence interval of the plurality of data points. The statistical confidence interval may be any suitable type of confidence interval, including but not limited to a 90-percent confidence interval, a 95-percent confidence interval, a 99-percent confidence interval, or any other suitable type of confidence interval.

At step 630, the method 600 includes collecting a current data point from a first sensor at the predetermined location. That is, one of the one or more sensors 110 may collect the first data point at the predetermined location. The first data point may be stored by the memory unit 114.

At step 640, the method 600 includes comparing the current data point to the statistical confidence interval of the plurality of data points. That is, the processor 112 may compare the current data point to the statistical confidence interval.

At step 650, the method 600 includes determining if the current data point falls within the statistical confidence interval of the plurality of data points. If the current data point falls within the statistical confidence interval (step 650=YES), the method 600 proceeds to step 660. If the current data point does not fall within the statistical confidence interval (step 650=no), the method proceeds to step 670.

At step 660, the method 600 includes determining that the first sensor has been verified. That is, the first data point falls within a statistical confidence interval of the plurality of data points, the processor 112 may determine that the first sensor is operating in an acceptable condition by comparing the current data point to the statistical confidence interval.

At step 670, the method 600 includes generating an alert. That is, if the processor 112 determines that the first data point does not fall within the statistical confidence interval of the plurality of data points, the processor 112 may generate an alert to be displayed by the alert display 113. The alert may be, as a non-limiting example, a text message indicating the first sensor is not operating properly, an illuminated warning light, an audio message indicating the first sensor is not operating properly, or any other suitable alert. The alert may indicate to the operator to inspect the sensor, de-activate the sensor, replace the sensor, or other suitable remedial techniques.

At step 680, the method 600 includes de-activating the first sensor. That is, the processor 112 may de-activate the first sensor so that the vehicle 100 does not rely on data generated by the first sensor.

Figure 7:
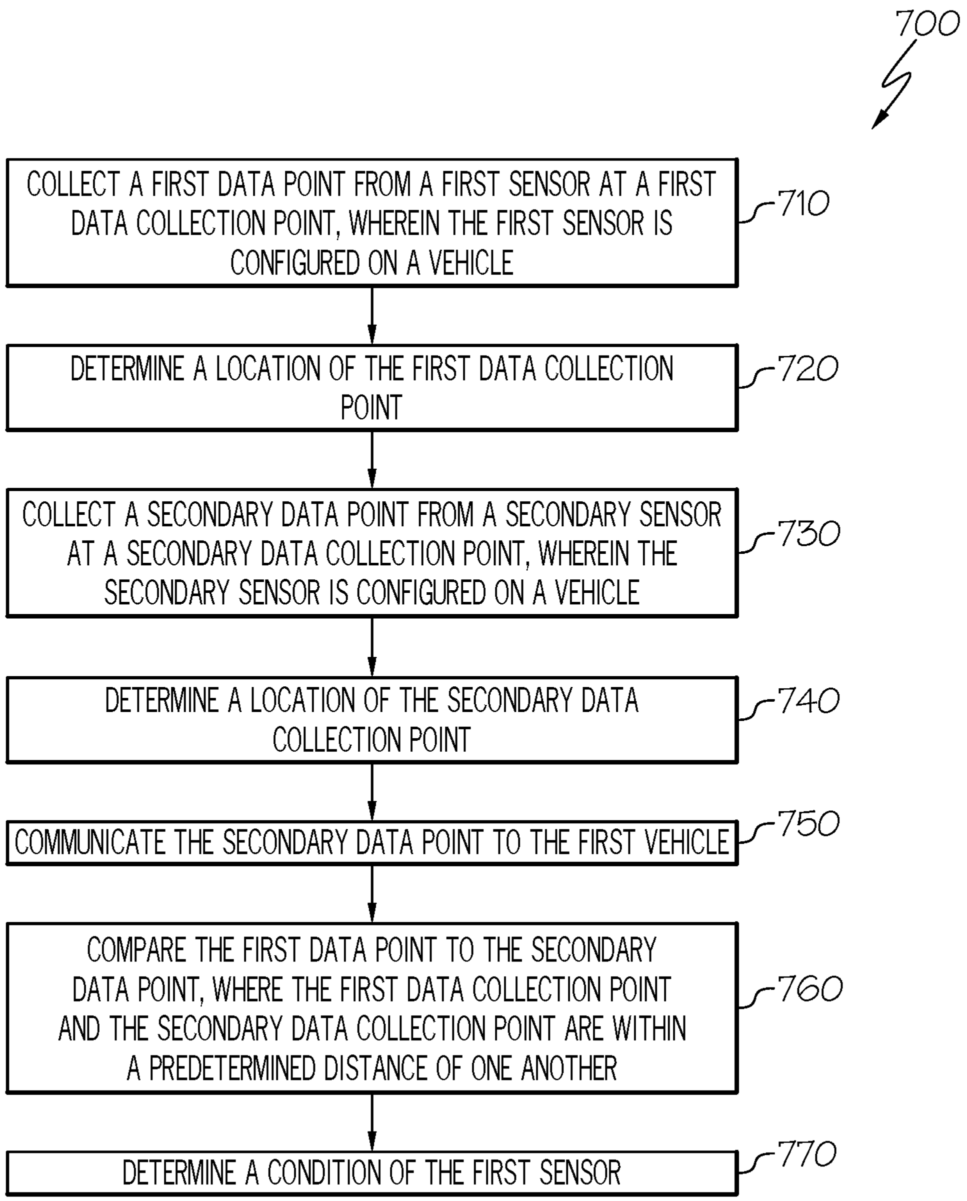
FIG. 7 schematically depicts a flowchart of a method for examining a condition of a vehicle sensor according to one or more embodiments shown and described herein.

Referring now to FIG. 7, an illustration of a method 700 is illustrated with reference to FIGS. 1-2 consistent with a disclosed embodiment. The method 700 is directed at determining a condition of a sensor. At step 710, the method 700 includes collecting a first data point from a first sensor at a first data collection point, wherein the first sensor is configured on a vehicle. That is, one of the one or more sensors 110 may collect the first data point at a specific location, such as a location on a roadway upon which the vehicle 100 is travelling. The first data point may be stored by the memory unit 114.

At step 720, the method 700 includes determining a location of the first data collection point. That is, the location device 116 may determine the location where the first data point is located. The location may be a GPS location, a latitude and longitude location, or any other suitable type of location. The location of the first data collection point may be tied to the first data point and stored by the memory unit 114.

At step 730, the method 700 includes collecting a secondary data point from a secondary sensor, where the secondary sensor is configured on a vehicle. That is, one or more sensors 210 of the second vehicle 200 may collect the secondary data point at a specific location, such as a location on a roadway upon which the second vehicle 200 is travelling. The secondary data point may be stored by the memory unit 214.

At step 740, the method 700 includes determining a location of the secondary data collection point. That is, the location device 216 may determine the location where the secondary data point is located. The location may be a GPS location, a latitude and longitude location, or any other suitable type of location. The location of the first data collection point may be tied to the secondary data point and stored by the memory unit 214.

At step 750, the method 700 includes communicating the secondary data point to the first vehicle. That is, the secondary data point may be communicated from the second vehicle 200 to the vehicle 100 via the network 150.

At step 760, the method 700 includes comparing the first data point to the secondary data point, where the first data collection point and the secondary data collection point are within a predetermined distance of each other. As a non-limiting example, the first data collection point and the secondary data collection point may be within one foot of one another, within ten feet of one another, within one hundred feet of one another, within one thousand feet of one another, or any other suitable distance. By determining if the first data collection point and the secondary data collection point are within a predetermined distance of one another, any differences between the data from the first sensor and the secondary sensor may be assignable to the performance of the sensor and not due to differences in the location of the where the data was captured. The first data point and the secondary data point may be compared by the processor 112. By comparing the first data point to the secondary data point, the method 700 may allow a sensor to be verified using data generated from other vehicles, and continually compared to data generated from other passing vehicles or other vehicles which have previously traversed the same roadway.

At step 770, the method 700 includes determining a condition of the first sensor. That is, if there is a sufficient difference between the first data point and the secondary data point, the processor 112 may determine the first sensor is not in suitable operating condition. In embodiments, the processor 112 may determine the first sensor is not in suitable operating condition if the first data point and the secondary data point are not within at least one-percent of each other, not within at least five-percent of each other, not within at least ten-percent of each other, or any other suitable difference. In further embodiments, such as when the data is non-quantifiable data such as camera data, image recognition, pixel to pixel comparison, or any other suitable comparison tool may be used to compare the first data point to the secondary data point.

Figure 8:
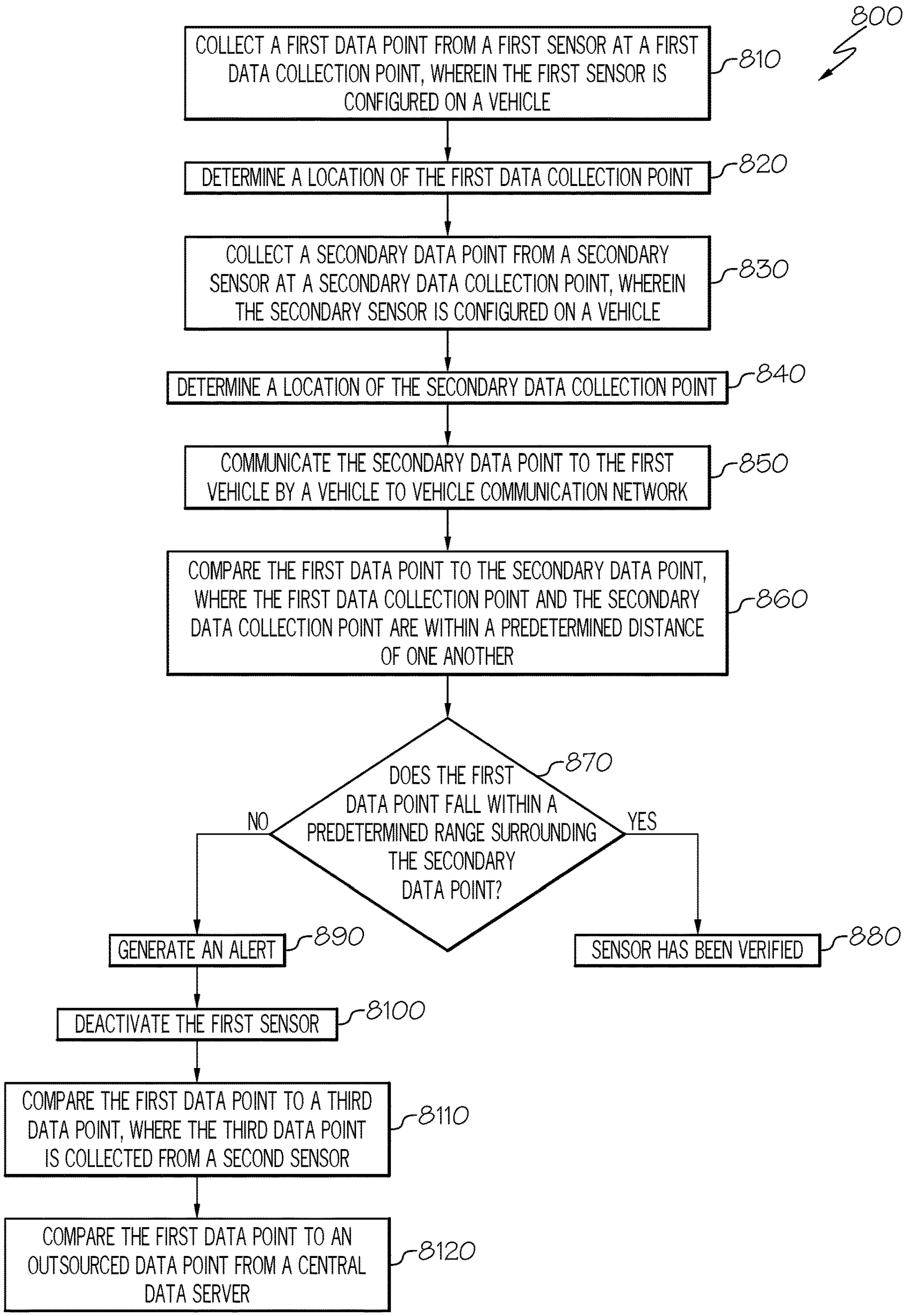
FIG. 8 schematically depicts a flowchart of a method for examining a condition of a vehicle sensor according to one or more embodiments shown and described herein.

Referring now to FIG. 8, an illustration of a method 800 is illustrated with reference to FIGS. 1-2 consistent with a disclosed embodiment. The method 800 is directed at determining a condition of a sensor. At step 810, the method 800 includes collecting a first data point from a first sensor at a first data collection point, wherein the first sensor is configured on a vehicle. That is, one of the one or more sensors 110 may collect the first data point at a specific location, such as a location on a roadway upon which the vehicle 100 is travelling. The first data point may be stored by the memory unit 114.

At step 820, the method 800 includes determining a location of the first data collection point. That is, the location device 116 may determine the location where the first data point is located. The location may be a GPS location, a latitude and longitude location, or any other suitable type of location. The location of the first data collection point may be tied to the first data point and stored by the memory unit 114.

At step 830, the method 800 includes collecting a secondary data point from a secondary sensor, where the secondary sensor is configured on a vehicle. That is, one or more sensors 210 of the second vehicle 200 may collect the secondary data point at a specific location, such as a location on a roadway upon which the second vehicle 200 is travelling. The secondary data point may be stored by the memory unit 214.

At step 840, the method 800 includes determining a location of the secondary data collection point. That is, the location device 216 may determine the location where the secondary data point is located. The location may be a GPS location, a latitude and longitude location, or any other suitable type of location. The location of the first data collection point may be tied to the secondary data point and stored by the memory unit 214.

At step 850, the method 800 includes communicating the secondary data point to the first vehicle. That is, the secondary data point may be communicated from the second vehicle 200 to the vehicle 100 via the network 150.

At step 860, the method 800 includes comparing the first data point to the secondary data point, where the first data collection point and the secondary data collection point are within a predetermined distance of each other. As a non-limiting example, the first data collection point and the secondary data collection point may be within one foot of one another, within ten feet of one another, within one hundred feet of one another, within one thousand feet of one another, or any other suitable distance. By determining if the first data collection point and the secondary data collection point are within a predetermined distance of one another, any differences between the data from the first sensor and the secondary sensor may be assignable to the performance of the sensor and not due to differences in the location of the where the data was captured. The first data point and the secondary data point may be compared by the processor 112. By comparing the first data point to the secondary data point, the method 800 may allow a sensor to be verified using data generated from other vehicles, and continually compared to data generated from other passing vehicles or other vehicles which have previously traversed the same roadway.

At step 870, the method 800 includes determining if the first data point falls within a predetermined range surrounding the secondary data point. That is, a predetermined range may be applied around the secondary collected data point and the processor 112 may determine if the first data point falls within the predetermined range. The predetermined range may be, as a non-limiting example, plus or minus one percent, plus or minus five percent, plus or minus ten percent, or any other suitable range. In some embodiments, the predetermined range may be one sided (i.e. within one percent above only). In further embodiments, the range may be limited to the exact value of the secondary data point. In further embodiments, such as when the data is non-quantifiable data such as camera data, image recognition, pixel to pixel comparison, or any other suitable comparison tool may be used to determine if the first data point falls within the predetermined range surrounding the secondary data point.

If step 870 equals YES, the method 800 proceeds to step 880. If step 870 equals NO, the method 800 proceeds to step 890.

At step 880, the method 800 includes determining that the first sensor has been verified. That is, the first data point falls within a predetermined range of the secondary data point, the processor 112 may determine that the first sensor is operating in an acceptable condition by comparing two different data points generated by different sensors configured on different vehicles at or near the same location.

At step 890, the method 800 includes generating an alert. That is, if the processor 112 determines that the first data point does not fall within a predetermined range surrounding the secondary data point, the processor 112 may generate an alert to be displayed by the alert display 113. The alert may be, as a non-limiting example, a text message indicating the first sensor is not operating properly, an illuminated warning light, an audio message indicating the first sensor is not operating properly, or any other suitable alert. The alert may indicate to the operator to inspect the sensor, de-activate the sensor, replace the sensor, or other suitable remedial techniques.

At step 8100, the method 800 includes de-activating the first sensor. That is, the processor 112 may de-activate the first sensor so that the vehicle 100 does not rely on data generated by the first sensor.

At step 8110, the method 800 includes comparing the first data point to a third data point, where the third data point is collected from a second sensor different from the first sensor. As a non-limiting example, if the first sensor is a temperature sensor, the processor 112 may compare the temperature recorded by the second sensor to the first sensor. This step may function as a double-check of the comparison performed at steps 860 and 870.

At step 8120, the method 800 includes comparing the first data point to an outsourced data point from a central data server. That is, the processor 112 may compare the first data point to an outsourced data point from the central data server 190. As a non-limiting example, if the first sensor is an exterior temperature sensor and the central data server 190 is a weather central data server, the processor 112 may compare the temperature collected by the first sensor to a temperature collected by the central data server 190. This step may function as a double-check of the comparison performed at steps 860 and 870.

Accordingly embodiments of the present disclosure may generally include a vehicle having one or more sensors, a memory unit, a processor, an alert display, a location device, and a communication device. The one or more sensors may collect data about various aspects of the operation of the vehicle, the surroundings of the vehicle, the operator or passengers of the vehicle, and/or other possible data sources. The data may be stored in the memory unit. The location of the collection point of the data may also be stored in the memory unit. The data may be communicated to various other entities through the communication device.

The methods may include steps to verify the condition of the sensor while the sensor remains mounted to a vehicle. The data collected by the sensor may be compared to a data point previously collected by the sensor to determine if the sensor is in an acceptable operating condition. In other embodiments, the data collected by the sensor may also be compared to a statistical confidence interval of previously collected data points to determine if the sensor is in an acceptable operating condition. In other embodiments, the data collected by the sensor may also be compared to data collected from a sensor configured on a second vehicle, where the data collected from the sensor configured on the second vehicle is communicated to the first vehicle.

It may be noted that one or more of the following claims utilize the terms "where," "wherein," or "in which" as transitional phrases. For the purposes of defining the present technology, it may be noted that these terms are introduced in the claims as an open-ended transitional phrase that are used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it may be noted that the various details described in this disclosure should not be taken to imply that these details relate to elements that are essential components of the various embodiments described in this disclosure, even in casings where a particular element may be illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A method for examining a condition of a vehicle sensor, the method comprising the steps of:

collecting a first data point from a first sensor at a first data collection point, wherein the first sensor is configured on a vehicle;

determining a location of the first data collection point;

comparing the first data point to a previously collected data point from the first sensor from a second data collection point, wherein the first data collection point and the second data collection point are within a predetermined distance of one another;

determining a condition of the first sensor, wherein determining the condition of the first sensor comprises determining if the first data point falls within a predetermined range surrounding the previously collected data point; and de-activating the first sensor if the first data point does not fall within the predetermined range surrounding the previously collected data point.

2. The method of claim 1, further comprising the step of:

generating an alert if the first data point does not fall within the predetermined range surrounding the previously collected data point.

3. The method of claim 1, wherein determining if the first data point falls within the predetermined range surrounding the previously collected data point is based on comparing the first data point to a third data point, wherein the third data point is collected by a second sensor, where the second sensor is mounted to the vehicle.

4. The method of claim 1, wherein determining if the first data point falls within the predetermined range surrounding the previously collected data point is based on comparing the first data point to an outsourced data point from a central data server.

5. The method of claim 1, wherein the first sensor comprises one of:

(1) a lidar sensor;

(2) a radar sensor; or (3) a camera sensor.

6. The method of claim 1, further comprising the step of automatically repeating all of the previous steps at a predetermined time interval.

7. A method for examining a condition of a vehicle sensor, the method comprising the steps of:

collecting a plurality of data points from a predetermined location by a first sensor configured on a vehicle;

determining a statistical confidence interval of the plurality of data points;

collecting a current data point from the first sensor at the predetermined location;

comparing the current data point to the statistical confidence interval of the plurality of data points;

determining a condition of the first sensor, wherein determining the condition of the first sensor comprises determining if the current data point falls within a predetermined range surrounding another previously collected data point of the plurality of data points; and after the step of determining if the current data point falls within the predetermined range surrounding the other previously collected data point, and if the current data point does not fall within the predetermined range surrounding the other previously collected data point:

comparing the current data point to an outsourced data point from a central data server.

8. The method of claim 7, further comprising the step of:

generating an alert if the current data point does not fall within the statistical confidence interval of the plurality of data points.

9. The method of claim 7, further comprising the step of:

de-activating the first sensor if the current data point does not fall within the statistical confidence interval of the plurality of data points.

10. The method of claim 7, wherein the first sensor comprises one of:

(1) a lidar sensor;

(2) a radar sensor; or (3) a camera sensor.

11. A method for examining a condition of a vehicle sensor, the method comprising the steps of:

collecting a first data point from a first sensor at a first data collection point, wherein the first sensor is configured on a vehicle;

determining a location of the first data collection point;

collecting a secondary data point from a secondary sensor at a secondary data collection point, wherein the secondary sensor is configured on a secondary vehicle;

determining a location of the secondary data collection point;

communicating the secondary data point to the vehicle;

comparing the first data point to the secondary data point, wherein the first data collection point and the secondary data collection point are within a predetermined distance of one another;

determining a condition of the first sensor, wherein determining the condition of the first sensor comprises determining if the first data point falls within a predetermined range surrounding the secondary data point; and after the step of determining if the first data point falls within the predetermined range surrounding the secondary data point, and if the first data point does not fall within the predetermined range surrounding the secondary data point:

comparing the first data point to a third data point, wherein the third data point is collected by a second sensor, where the second sensor is mounted to the vehicle.

12. The method of claim 11, wherein the step of communicating the secondary data point to the vehicle further comprises communicating the secondary data point to the vehicle by a vehicle to vehicle communication network.

13. The method of claim 11, further comprising the step of:

generating an alert if the first data point does not fall within the predetermined range surrounding the secondary data point.

14. The method of claim 11, further comprising the step of:

de-activating the first sensor if the first data point does not fall within the predetermined range surrounding the secondary data point.

15. The method of claim 11, further comprising, after the step of determining if the first data point falls within the predetermined range surrounding the secondary data point and if the first data point does not fall within the predetermined range surrounding the secondary data point, comparing the first data point to an outsourced data point from a central data server.

16. The method of claim 11, wherein the first sensor comprises one of:

(1) a lidar sensor;

(2) a radar sensor; or (3) a camera sensor.

* * * * *